United States Patent
Rink et al.

[11] Patent Number: 6,117,254
[45] Date of Patent: Sep. 12, 2000

[54] INITIATOR FOR AIRBAG INFLATION GAS GENERATION VIA DISSOCIATION

[75] Inventors: Karl K. Rink, Liberty; William B. Richardson, Kaysville; David J. Green, Brigham City, all of Utah

[73] Assignee: Autoliv ASP, Inc., Ogden, Utah

[21] Appl. No.: 09/027,020

[22] Filed: Feb. 20, 1998

[51] Int. Cl.$^7$ .............................. C06B 35/00; C06D 5/06
[52] U.S. Cl. ...................... 149/35; 149/109.6; 102/288; 102/289
[58] Field of Search .................. 149/35, 109.6; 102/288, 289

[56] References Cited

U.S. PATENT DOCUMENTS

| | | |
|---|---|---|
| 651,132 | 6/1900 | Davis . |
| 1,056,560 | 3/1913 | Lippincott . |
| 1,805,721 | 5/1931 | Kogl ................................ 89/19 |
| 2,334,211 | 11/1943 | Miller ............................. 23/282 |
| 2,403,932 | 7/1946 | Lawson ........................... 252/186 |
| 2,995,987 | 8/1961 | Fitzpatrick ......................... 89/7 |
| 3,664,134 | 5/1972 | Seitz ............................... 60/274 |
| 3,862,866 | 1/1975 | Timmerman et al. ............. 149/21 |
| 3,958,949 | 5/1976 | Plantif et al. ................... 23/281 |
| 3,964,256 | 6/1976 | Plantif et al. ................... 60/219 |
| 3,986,456 | 10/1976 | Doin et al. ..................... 102/39 |
| 4,994,125 | 2/1991 | Mei ............................... 149/22 |
| 5,060,973 | 10/1991 | Giovanetti ...................... 280/736 |
| 5,171,385 | 12/1992 | Michels et al. ................ 149/19.1 |
| 5,230,287 | 7/1993 | Arrell, Jr. et al. ............. 102/202.5 |
| 5,330,730 | 7/1994 | Brede et al. ................... 422/305 |
| 5,403,036 | 4/1995 | Zakula et al. .................. 280/741 |
| 5,404,813 | 4/1995 | Wong ............................ 102/289 |
| 5,428,988 | 7/1995 | Starkovich ...................... 73/40 |
| 5,429,691 | 7/1995 | Hinshaw et al. ................ 149/45 |
| 5,439,537 | 8/1995 | Hinshaw et al. ................ 149/22 |
| 5,464,248 | 11/1995 | Sasaki et al. .................. 280/741 |
| 5,470,104 | 11/1995 | Smith et al. ................... 280/737 |
| 5,487,798 | 1/1996 | Williams ..................... 149/35 X |
| 5,494,312 | 2/1996 | Rink .............................. 280/737 |
| 5,518,268 | 5/1996 | Moore et al. .................. 280/737 |
| 5,531,473 | 7/1996 | Rink et al. .................... 280/737 |
| 5,536,339 | 7/1996 | Verneker ...................... 149/19.5 |
| 5,668,345 | 9/1997 | Schroeder et al. ............. 102/289 |
| 5,669,629 | 9/1997 | Rink ............................. 280/741 |
| 5,672,843 | 9/1997 | Evans et al. .................. 102/289 |
| 5,713,595 | 2/1998 | Mooney et al. ............... 280/736 |
| 5,756,930 | 5/1998 | Chan et al. ................... 11/11 X |

*Primary Examiner*—Peter A. Nelson
*Attorney, Agent, or Firm*—Sally J. Brown

[57] ABSTRACT

An apparatus and method for inflating a vehicular inflatable device are provided wherein inflation gas is produced via a dissociative material wherein an initiator includes an enhanced fuel pyrotechnic formulation which, in addition to initiating dissociation of at least a portion of a quantity of gas source material contained within the inflator, forming dissociation products used to inflate the device, also forms particles to interact with one or more of at least a portion of the remaining quantity of gas source material contained within the inflator and the dissociation products to form additional inflation products for inflating the inflatable device.

7 Claims, 1 Drawing Sheet

INITIATOR FOR AIRBAG INFLATION GAS GENERATION VIA DISSOCIATION

CROSS REFERENCE TO RELATED APPLICATIONS

The subject matter of this application is related to prior U.S. patent application Ser. No. 08/935,014 now U.S. Pat. No. 5,941,562 and Ser. No. 08/935,016, now U.S. Pat. No. 5,884,938 each respectively filed on Sep. 22, 1997 as a continuation-in-part application of application U.S. Ser. No. 08/632,698, filed on Apr. 15, 1996, now Rink, U.S. Pat. No. 5,669,629, issued Sep. 23, 1997, and U.S. Ser. No. 09/005,274, filed on Jan. 9, 1998. The disclosures of each and every of these prior applications are hereby incorporated by reference herein and made a part hereof, including but not limited to those portions which specifically appear hereinafter.

BACKGROUND OF THE INVENTION

This invention relates generally to inflatable restraint systems and, more particularly, to an apparatus and method for inflating an inflatable device such as an inflatable vehicle occupant restraint for use in such systems.

It is well known to protect a vehicle occupant using a cushion or bag, e.g., an "airbag cushion," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings of prior inflator devices, a new type of inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such inflator devices typically utilize a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such an inflator can successfully overcome, at least in part, some of the problems commonly associated with the above-identified prior types of inflator devices, there is a continuing need and demand for further improvements in safety, simplicity, effectiveness, economy and reliability in the apparatus and techniques used for inflating an inflatable device such as an airbag cushion.

To that end, the above-identified Rink, U.S. Pat. No. 5,669,629 discloses a new type of inflator wherein a gas source material undergoes decomposition to form decomposition products including at least one gaseous decomposition product used to inflate an inflatable device.

Such an inflator can be helpful in one or more of the following respects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

Inflator devices commonly employ an initiator device which, upon actuation, serves to ignite or fire a pyrotechnic formulation for the subsequent generation, formation, release or the like of inflation gas for the inflation of an associated inflatable device, for example. Pyrotechnic formulations normally constitute both a fuel and an oxidant. In normal pyrotechnic formulations, all the oxidant is usually supplied as a constituent of the formulation.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi=(F/O)_A/(F/O)_S \tag{1}$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Reactant mixtures and combinations having equivalence ratios of less than one are generally designated as "fuel-lean" formulations; those reactant mixtures and combinations having equivalence ratios equal to one are generally designated as "stoichiometric" mixtures; and those reactant mixtures and combinations having equivalence ratios of greater than one are generally designated as "fuel-rich" formulations.

In practice, pyrotechnic formulations for initiators are often designed to be over-oxidized to better ensure complete combustion of the fuel. For example, typical initiators containing a pyrotechnic formulation of zirconium potassium perchlorate (commonly referred to as "ZPP") have a formulation equivalence ratio in a range of 0.7 to 1.0. Generally speaking, initiator formulations having an equivalence ratio of greater than one have been sought to be avoided as such formulations generally contain insufficient oxidant to fully oxidize the available fuel and thus such fuel will not contribute to the sought reaction.

There is a continuing need and demand for further improvements in safety, simplicity, effectiveness, economy and reliability in the apparatus and techniques used for inflating an inflatable device such as an airbag cushion. More specifically, there is a need and a demand for an inflator device which can provide at least some of the benefits provided by the inflator of the above-identified Rink, U.S. Pat. No. 5,669,629, wherein a gas source material undergoes decompositional or dissociative-type reaction to form products including at least one gaseous product used to inflate an inflatable device while also providing more complete and repeatable inflation gas formation and thereby reduce or minimize the variability in performance between similar inflator devices under the same or similar operating conditions.

SUMMARY OF THE INVENTION

A general object of the invention is to provide an improved apparatus and method for inflating an inflatable device such as an inflatable vehicle occupant restraint for use in such an inflatable restraint system.

A more specific objective of the invention is to overcome one or more of the problems described above.

The general object of the invention can be attained, at least in part, through an initiator device for an inflator which contains a quantity of a gas source material and which inflator generates gas for inflating an inflatable device via dissociation of at least a portion of the quantity of gas source material. More specifically, the initiator device includes a pyrotechnic formulation which, upon actuation of the initiator device, discharges to initiate dissociation of at least a portion of the quantity of gas source material contained within the inflator forming dissociation products used to inflate the device and to form particles to interact with one or more of at least a portion of the remaining quantity of gas source material contained within the inflator and dissociation products to form additional inflation products for inflating the inflatable device.

The prior art fails to show, suggest or provide an initiator device, an inflator, or a method of inflating an inflatable safety device in a vehicle via the dissociation of a selected gas source material which improves, increases or maximizes the efficiency of the dissociation process to the extent desired or required. In particular, the prior art fails to disclose a manner in which the formulation of a dissociation initiator can be adjusted to efficiently effect the dissociation of a gas source material and, in particular, the dissociation of nitrous oxide.

The invention further comprehends an inflator apparatus for inflating an inflatable device. Such an inflator apparatus includes a first chamber having contents including a quantity of nitrous oxide gas source material. The inflator apparatus also includes an initiator containing a pyrotechnic formulation. Upon actuation, the initiator and, more specifically the pyrotechnic formulation thereof, discharges within the inflator to:

a) initiate dissociation of at least a portion of the quantity of nitrous oxide to form dissociation products including at least one gaseous dissociation product used to inflate the device and b) form particles to interact with one or more of at least a portion of the quantity of nitrous oxide and the dissociation products to form additional inflation products for inflating the inflatable device.

The invention still further comprehends a method of inflating an inflatable safety device in a vehicle using an inflator which includes a chamber containing a gas source material and which inflator generates inflation gas via dissociation of at least a portion of the gas source material. The method includes the step of actuating an initiator comprising a pyrotechnic formulation. The initiator device and, more specifically the pyrotechnic formulation contained therein discharges into the gas source material-containing chamber. Such discharge serves to initiate dissociation of at least a portion of the gas source material contained within the inflator to form dissociation products including at least one gaseous dissociation product used to inflate the device. Such discharge also serves to form particles to interact with one or more of at least a portion of the gas source material stored within the inflator and the dissociation products to form additional inflation products used to inflate the device. Inflation gas, including at least a portion of the at least one gaseous dissociation product, is released from the inflator to inflate the inflatable safety device.

The invention yet still further comprehends a method for inflating an inflatable safety device in a vehicle using an inflator which generates inflation gas via dissociation of a quantity of nitrous oxide gas source material stored within a chamber of the inflator. The method includes the step of actuating an initiator containing a pyrotechnic formulation to produce sufficient heat to initiate dissociation of at least a portion of the quantity of nitrous oxide gas source material to form nitrous oxide dissociation products including at least one gaseous dissociation product used to inflate the device and to form particles to interact with one or more of at least a portion of the quantity of nitrous oxide and the nitrous oxide dissociation products to form additional gaseous products used to inflate the device.

As used herein, references to "combustion," "combustion reactions" and the like are to be understood to generally refer to the exothermic reaction of a fuel with an oxidant.

References to "dissociation," "dissociation reactions" and the like are to be understood to refer to the dissociation, splitting, decomposition or fragmentation of a single molecular species into two or more entities. "Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

As used herein, references to a propellant and, more specifically, a pyrotechnic charge as constituting an "enhanced fuel" are to be understood to refer to a charge composition which, as described in greater detail below, in addition to reacting to produce heat such as to initiate dissociation of at least a portion of a quantity of nitrous oxide contained within an inflator, also reacts or otherwise forms particles to interact with one or more of at least a portion of the remaining quantity of nitrous oxide contained within the inflator and dissociation products to form additional inflation products such as for use inflating an associated inflatable device.

Other objects and advantages will be apparent to those skilled in the art from the following detailed description taken in conjunction with the appended claims and drawing.

BRIEF DESCRIPTION OF THE DRAWING

The FIGURE is a simplified, partially in section, schematic drawing of an airbag inflator assembly in accordance with one embodiment of the invention.

DETAILED DESCRIPTION OF THE INVENTION

Figure 1:
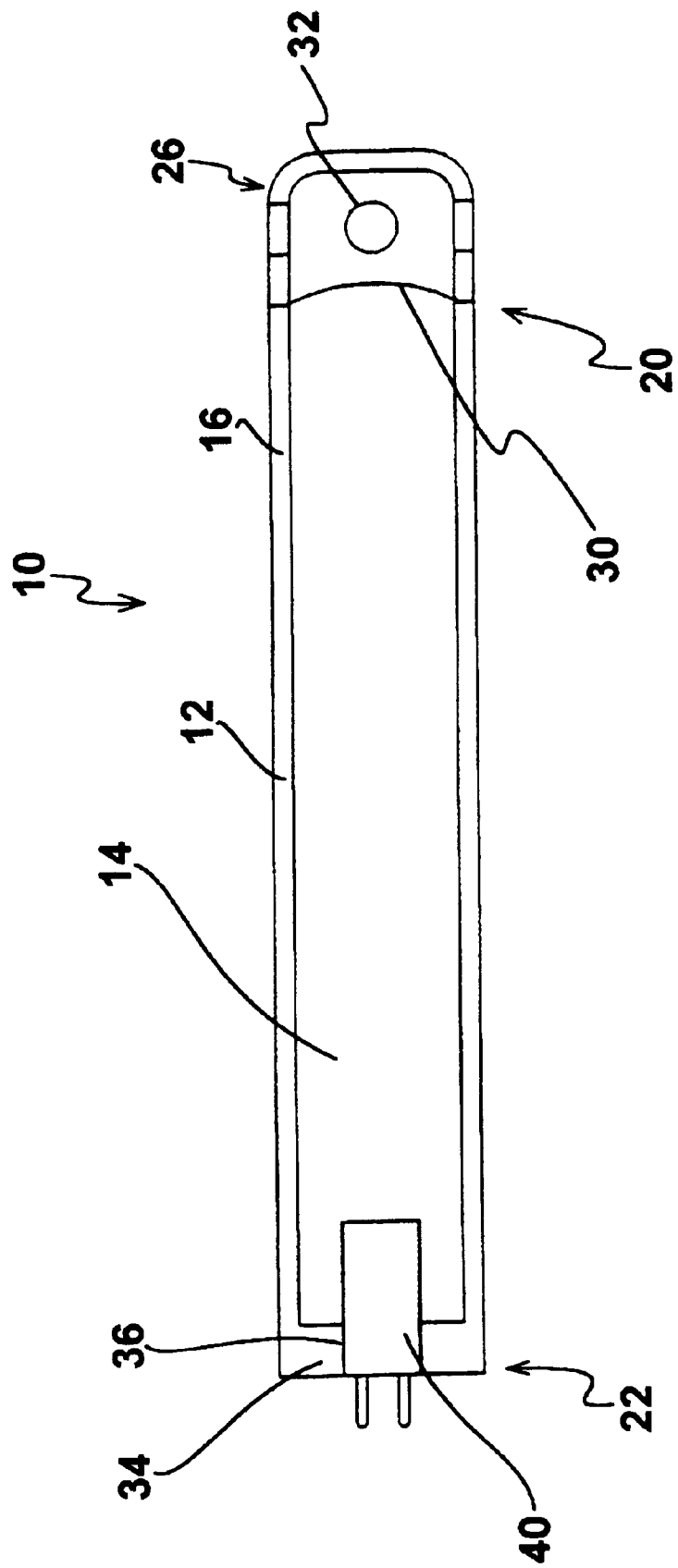

The present invention may be embodied in a variety of different structures. As representative, the FIGURE illustrates the present invention as embodied in an airbag inflator assembly, generally designated by the reference numeral 10, such as may be used to inflate an inflatable vehicle occupant restraint, e.g., an inflatable airbag cushion, (not shown). As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

As will be described in greater detail below, the inflator assembly 10 generates inflation gas via a decomposing material or, more specifically, a dissociative material. While the invention is described hereinafter with particular reference to an inflator for side impact airbag assemblies in various automotive vehicles including vans, pick-up trucks, and particularly automobiles, it is to be understood that the invention also has applicability not only with other types or kinds of airbag module assemblies for automotive vehicles including driver side and passenger side airbag module assemblies, but also with other types of vehicles including, for example, airplanes.

The inflator assembly 10 comprises a pressure vessel 12 including a chamber 14 that contains a gas source material. As disclosed in above-identified Rink, U.S. Pat. No. 5,669,629, there are various gas source materials which, under specified conditions, undergo reaction variously termed decomposition or dissociation reaction to form products including at least one gaseous product such as may be used to inflate an associated vehicle occupant restraint. Thus, the chamber 14 is sometimes referred to herein as a "dissociation chamber."

As disclosed in Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, upon the dissociation of nitrous oxide, the dissociation products ideally are nitrogen and oxygen:

$$2N_2O = 2N_2 + O_2 \tag{2}$$

Thus, not only does such reaction form products which are generally non-toxic and non-corrosive but also results in the production or formation of molecular oxygen.

As will be appreciated, such oxygen may then be available for subsequent reaction such as may result in further or enhanced inflation gas production or formation.

It is to be understood that such nitrous oxide can, for example and as desired, be stored in a gaseous, liquid or multi-phase form (i.e., partially gaseous and partially liquid mixture). The premium on size generally placed on modern vehicle design, however, results in a general preference for smaller sized airbag inflators. In view thereof and the fact that the density of nitrous oxide is significantly greater when in a liquid, rather than gaseous form, one preferred embodiment of the invention involves storage of nitrous oxide primarily in a liquid form.

It is also to be understood that while such nitrous oxide dissociative gas source material can be contained within the dissociative chamber in a pure form (e.g., such that the chamber contents include no more than minor levels of other materials, such as air as may be present in the dissociative chamber prior to being filled with the dissociative gas source material), it may be preferred to include an inert gas therewith. For example, an inert gas such as helium can be included with nitrous oxide to facilitate leak checking of the inflator apparatus or, more specifically, of the dissociative chamber thereof Alternatively or in addition, an inert gas, such as argon and helium, for example, or mixture of such inert gases, can be included to supplement the gas produced or formed upon the dissociation of the nitrous oxide.

Additionally or alternatively and as disclosed in the above-identified U.S. patent application Ser. No. 08/935,016, the dissociation chamber 14 may contain a quantity of at least one radioactive isotope leak trace material whereby fluid leakage from the chamber can be detected as disclosed in therein.

In addition, if desired, the dissociation chamber 14 may additionally contain a quantity of oxygen gas such as in molecular form and such as may beneficially and desirably supplement such molecular oxygen as may be formed upon the dissociation of stored or included nitrous oxide.

Still further, such a dissociation chamber can, if and as desired, also include a sensitizer material to promote or accelerate the rate of such dissociative reaction. Various sensitizer materials disclosed and identified in above-identified Rink, U.S. Pat. No. 5,669,629. As disclosed therein, sensitizer materials are typically hydrogen-bearing materials. Such sensitizer materials are generally added to the dissociative gas source material in small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable and thus combustion and the formation of combustion products are practically avoided.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen-bearing sensitizer material for use in the practice of the invention.

Returning to the FIGURE, the chamber 14 is defined in part by an elongated generally cylindrical sleeve 16. The sleeve 16 may include a fill port (not shown), as is known in the art, wherethrough materials can be passed into the chamber 14.

In practice, in such an inflator design that uses about 10% to about 30% (by volume) nitrous oxide in an inert gas such as argon, such a dissociation chamber 14 is typically filled to a pressure in the range of about 3500 psia (24.1 MPa) to about 4500 psia (31.0 MPa). On the other hand, such inflator designs that contain the nitrous oxide in a pure or nearly pure state (e.g., contain about 90% up to 100% by volume nitrous oxide), may typically be filled to pressures of about 500 psia (3.4 MPa) to about 2500 psia (17.2 MPa).

The sleeve 16 has a first end 20 and a second end 22. The first end 20 is closed by means of a diffuser assembly 26. Such a diffuser assembly can be integral (i.e., formed continuous with and in one piece) with the sleeve 16 or, if desired or preferred, joined or attached thereto in an appropriate manner, such as by an inertial weld.

The contents of the chamber 14 are normally kept separate from the diffuser assembly 26 and contained within the chamber 14 through the inclusion of a selected sealing means, e.g., by means of a burst disc 30 in sealing relationship therebetween. The diffuser assembly 26 includes a plurality of openings 32, wherethrough the inflation gas from the inflator assembly 10 is properly dispensed into the associated occupant restraint. Thus, the diffuser assembly 26 can serve to facilitate direction of the inflation fluid from the inflator assembly 10 into the associated inflatable vehicle occupant restraint.

The sleeve second end 22 is partially closed by a base wall 34. The base wall 34 includes an opening 36 therein, wherethrough an initiator device 40, such as described in greater detail below, is attached in sealing relation within the dissociation chamber 16. As will be appreciated, such attachment can be effected by various appropriate means such as with a weld, crimp or other suitable hermetic seal, for example.

In accordance with the invention, the initiator device includes a desired load of an enhanced fuel pyrotechnic charge. More specifically, such an initiator device contains a pyrotechnic formulation, such that upon actuation of the initiator device, the discharge serves to initiate dissociation of at least a portion of quantity of the gas source material contained within the inflator, such dissociation resulting in the formation of dissociation products used to inflate the device. Further, upon actuation, the pyrotechnic formulation also serves to form particles to interact with one or more of at least a portion of the remaining quantity of the gas source material contained within the inflator and dissociation products to form additional inflation products for inflating the inflatable device.

In accordance with one preferred embodiment of the invention, such an enhanced pyrotechnic formulation discharges hot particles into contact with the dissociating gas source material contained within the inflator assembly. More specifically, such hot particles are generally discharged into the dissociation chamber which contains a quantity of the gas source material.

In the broader practice of the invention, it will be appreciated that while such discharge products may initially take the form of a fluid, e.g., a liquid, or a solid, the discharge products will generally form particles in contact with the dissociative gas source material contained within the inflator assembly. As will be appreciated, such particles will generally be relatively hot and desirably may serve to initiate dissociation of additional quantities of the gas source material, such as contained within the inflator assembly, and such as may serve to form additional inflation products for inflating the associated inflatable device.

In one preferred form of the invention, an enhanced fuel pyrotechnic formulation discharges, either directly or with subsequent formation, hot particles which themselves constitute a form of fuel material. As will be appreciated, such fuel may desirably contact and react with oxidant material within the inflator, more specifically such as within the dissociation chamber 14, to form additional inflation products for inflating the associated inflatable device. In practice, such reaction will typically be in the nature of a combustion reaction though it is to be understood that the invention in its broader terms is not so limited.

Many different pyrotechnic materials can be used in the practice of the invention. An enhanced fuel pyrotechnic formulation in accordance with one preferred embodiment of the invention constitutes a metal-based pyrotechnic composition, such as ZPP, which is oxidized to a lesser extent, e.g., often near stoichiometric or at least sightly fuel-rich, than normally associated for a composition of such a pyrotechnic material. Various handling concerns may arise with the production of relatively large loads of ZPP. Thus, ZPP is not commonly used in initiator loads as large or much larger than 400 mg. This may present a problem, as ZPP loads larger than 400 mg may be desired in the practice of the invention to better ensure proper operation. In view thereof, the practice of the invention utilizing a pyrotechnic material which is less sensitive or otherwise avoids or reduces such handling concerns may be desirable.

To this end, metal hydride pyrotechnic materials such as zirconium hydride potassium perchlorate (ZHPP) and titanium hydride potassium perchlorate (THPP) are generally significantly safer to handle than metal perchlorates (such as ZPP) mentioned above. In view thereof, the practice of the invention using such metal hydrides can be particularly advantageous as, for example, the potential safety concerns associated with the supplying or providing of a corresponding pyrotechnic load of greater than 400 mg in a single device can be greatly reduced or minimized.

Moreover, such metal hydrides commonly produce hydrogen as a normal product of the combustion thereof. As will be appreciated, in a nitrous oxide-rich environment such as present in one preferred embodiment of the invention, such hydrogen can and typically will be readily consumed. Thus, within an inflator device of the invention, such hydrogen can act as an additional fuel source, with the heat released through the direct or indirect combustion or reaction of the hydrogen with the nitrous oxide also contributing to the total heat output of or from the device. In practice, the total amount of hydrogen produced by metallic hydride formulations in accordance with the invention may be as great as 2% or more by volume of the total effluent constituents.

Actuation of an initiator containing such a pyrotechnic formulation, desirably can result in the discharge of hot radiant metal particles into the surrounding nitrous oxide environment. While not wishing to be limited to a particular theory of operation, such particles are believed to burn in the nitrous oxide environment and thus serve to provide heat release over a prolonged or extended period of time, as compared to a similar quantity of a formulation composed of a fine powder. As will be appreciated, such prolonged or extended heat release can advantageously result in more complete and repeatable dissociation of the gas source material, e.g., the nitrous oxide.

It will be understood that various formulation parameters and characteristics may limit or impact the practice and operation of the invention. For example, particle parameters and characteristics such as quantity, size and shape, may each be selected, as described in greater detail below, in order to assist in providing desired operation.

More specifically, the quantity of metal particles present in relation to the amount of nitrous oxide can be selected to provide the desired performance measured, primarily, in terms of the maximum pressure generated in a closed volume. Such a relative quantity can be expressed in terms of the equivalence ratio. In general, for a given quantity of nitrous oxide, it is generally desirable to maintain the amount of such particle fuel such that the equivalence ratio is generally less than 0.25, preferably less than 0.15.

With respect to size, it is generally desirable to maintain the particle diameter in pyrotechnic formulations in a range of about 1 to about 20 microns and, more particularly, in a range of about 1 to about 10 microns. In accordance with the invention, however, the inclusion of some larger particles of fuel in the pyrotechnic formulation is desired. In practice, such larger particles can be distributed in a range of from about 25 to about 10,000 microns, preferably particles of a diameter of up to about 1000 microns and, more specifically, particles of a diameter of up to about 500 microns.

It will be appreciated that while such larger particles may constitute up to about 100% of the fuel content of a pyrotechnic formulation in accordance with the invention, in general it is believed desirable to limit inclusion of such larger particles to no more than about 50% by mass, and, more preferably, no more than about 25% by mass of the total fuel load.

Shape, in conjunction with size, may also play a significant role in the practice of the invention. As will be appreciated, if the particles are relatively fine and the pyrotechnic formulation features a relatively high surface area, the formulation will generally burn very rapidly and may result in high internal pressures within the inflator and less or incomplete dissociation of the nitrous oxide. On the other hand, if the particles are too large, they can be relatively difficult to ignite and thus may not ultimately be utilized or at least fully utilized in the invention.

In operation, such as upon the sensing of a collision, an electrical signal is sent to the initiator device 40. Upon actuation, the enhanced fuel pyrotechnic formulation containing-initiator device 40 functions and discharges to initiate dissociation of at least a portion of the quantity of gas source material contained within the inflator forming dissociation products used to inflate the device and to form particles to interact with one or more of at least a portion of the remaining quantity of gas source material contained within the inflator and dissociation products to form additional inflation products for inflating the inflatable device.

More specifically, in accordance with a preferred embodiment of the invention, the initiator device discharges high temperature combustion products into the dissociation chamber 14 and the contents thereof. As identified above, the dissociation chamber contains a gas source material which, in one preferred embodiment of the invention, is nitrous oxide. As further identified above, such gas source material can be stored or contained within the dissociation chamber either alone or in combination with one or more additional gas source materials, inert gases, and oxidants, for example.

Further, the enhanced fuel pyrotechnic formulation containing-initiator device 40 functions to discharge to form particles. As described above, such particles can take the form of hot radiant metal particles discharged into the surrounding nitrous oxide environment and thus serve to provide heat release over a prolonged or extended period of time. As a result, a more complete and repeatable dissociation of the gas source material, e.g., the nitrous oxide, can be realized through the practice of the invention.

The large heat addition from the initiator desirably results in commencement of the exothermic thermal dissociation of the $N_2O$. In this thermal dissociation, the $N_2O$ begins to breakdown into smaller molecular fragments. As the $N_2O$ molecules fragment, the associated release of energy results in further heating of the remaining chamber contents. The increase both in temperature and the relative amount of gaseous products within the dissociation chamber 14 results in a rapid pressure rise within the dissociation chamber.

When the gas pressure within the dissociation chamber 14 exceeds the structural capability of the burst disc 30, the disc ruptures or otherwise permits the passage of the inflation gas through the openings 32 in the diffuser assembly 26 into an associated airbag assembly.

Thus, the invention provides an inflator device and associated method for inflating an inflatable device which reduce or minimize handling concerns and provide inflation gas which desirably is harmless, non-toxic and at relatively low temperature when exiting from the inflator assembly. Further, the invention provides an inflator device and associated method for inflating an inflatable device wherein a gas source material undergoes dissociation to form products of dissociation including at least one gaseous dissociation product used to inflate an inflatable device while also providing more complete and repeatable inflation gas formation and thereby reduce or minimize the variability in performance between similar inflator devices under the same or similar operating conditions.

The present invention is described in further detail in connection with the following examples which illustrate/simulate various aspects involved in the practice of the invention. It is to be understood that all changes that come within the spirit of the invention are desired to be protected and thus the invention is not to be construed as limited by these examples.

EXAMPLES

One dominant reaction of zirconium hydride potassium perchlorate (ZHPP) can be characterized by the following reaction:

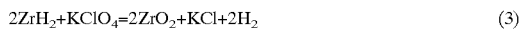
(3)

or, alternatively, one may write

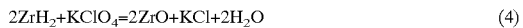
(4)

It should be understood that the two reaction equations shown above are suggested only for purpose of demonstration in connection with the calculations of the examples. Clearly, a more generalized reaction mechanism would include additional chemical species as possible products of combustion. In addition, it should be noted that the ZHPP formulation explicitly shown here is merely representative of an entire family of metal hydride compositions. As will be appreciated, many other metal hydride formulations and stoichiometries are possible.

Given the above reactions, the stoichiometric fuel-to-oxidant ratio is calculated as:

$(F/O)_S = 1.3459$

Using the above definition of equivalence ratio as the ratio of the actual fuel-to-oxidant ratio divided by the stoichiometric fuel-to-oxidant ratio, the equivalence ratio for different mass ratios of the pyrotechnic constituents can be easily calculated, as shown below.

| Example | Pyrotechnic Type | Formulation (mass ratio) | Charge Load (mg) | Equivalence Ratio | Pressure (MPa) | Temperature (° K.) | Hydrogen Mole Fraction | Water Mole Fraction |
|---|---|---|---|---|---|---|---|---|
| 1 | ZPP | 50/50 | 400 | 0.759 | 2.37 | 4584 | 0.000 | 0.000 |
| 2 | THPP | 40/60 | 350 | 0.925 | 2.71 | 3659 | 0.036 | 0.153 |
| 3 | THPP | 45/55 | 350 | 0.961 | 2.76 | 3691 | 0.042 | 0.151 |
| 4 | ZHPP | 45/55 | 350 | 0.608 | 2.40 | 3407 | 0.008 | 0.096 |
| 5 | ZHPP | 50/50 | 350 | 0.743 | 2.49 | 3693 | 0.019 | 0.094 |
| 6 | ZHPP | 57.4/42.6 | 350 | 1.000 | 2.62 | 4044 | 0.062 | 0.067 |
| 7 | THPP | 41.9/58.1 | 350 | 1.000 | 2.76 | 3739 | 0.052 | 0.148 |

| Formulation (mass ratio) | $m_f/m_{ox}$ | Equivalence ratio ($\phi$) |
|---|---|---|
| 40/60 | 0.667 | 0.495 |
| 45/55 | 0.818 | 0.608 |
| 50/50 | 1.000 | 0.743 |
| 55/45 | 1.222 | 0.908 |
| 57.4/42.6 | 1.346 | 1.000 |
| 60/40 | 1.500 | 1.115 |

A similar table can be constructed for titanium hydride potassium perchlorate (THPP).

The performance of various proposed initiator formulations can be estimated in a convenient and cost-effective manner through the use of a computer program that accurately predicts the pressure produced by a particular initiator when fired into a closed vessel.

A series of computer simulations were done, using the computer program "COSMIC," to estimate the load and formulation of an enhanced fuel pyrotechnic material suitable as a replacement for a 400 mg charge load of ZPP pyrotechnic, having a 50/50 fuel-to-oxidant mass ratio. COSMIC is a computer program identified for the calculation of complex chemical equilibrium compositions, rocket performance, incident and reflected shocks and Chapman-Jouguet detonations. COSMIC was developed by Gordon and McBride for the National Aeronautics and Space Administration and the specific version utilized in these simulations was identified as COSMIC PROGRAM # LEW-14166.

The computer program was subject to certain limitations based on certain assumptions made in determining the governing equations used in formulating the program. These assumptions included providing no allowance for heat transfer effects and chemical equilibrium among the reactant and product species. In addition, due to factors such as the presence of various condensed species, it is sometimes difficult to accurately predict the properties of the combustion products in conjunction with fuel-rich formulations. In view thereof, simulations for fuel-rich formulations are not here presented.

In these computer simulation examples, a closed volume of 98.3 cc was used and, for calculating the input parameters for the computer model, it was assumed that air initially occupied the interior volume of the 98.3 cc closed vessel at a pressure of 12.7 psia (the local atmospheric pressure). In addition, all the initiator charge load formulations were assumed to contain an additional 35 mg load of ZPP as a bridgewire ignition charge. The primary thermodynamic parameters of interest include: the pressure and temperature of the combustion products as well as the mole fraction of hydrogen in the effluent. The results of these simulations are presented below:

DISCUSSION OF RESULTS

Several important conclusions can be drawn from these results. First, it is seen that at or near stoichiometric formulations of a 350 mg ZHPP or THPP initiators produce vessel pressures greater than that produced by a fuel-lean formulation of a 400 mg ZPP initiator. It will be appreciated that pressure generation by such initiator devices may aid, contribute or ultimately result in the desired rupture or opening of the burst disc or the like such as used within the above-described inflators and by which burst disc the contents of the inflator are normally maintained in a stored or sealed relationship such as until the inflator has been properly actuated. Further, the rupture or opening of such a burst disc in direct response to the discharge of the initiator device can help ensure a more immediate response by the system. Thus, it appears that a 400 mg ZPP load can be replaced by a similar, or perhaps smaller-sized load of ZHPP or THPP. Such replacement may represent an important safety improvement in the design, manufacture and operation of such inflator devices.

It is further noted that the expected maximum temperature of the fuel-lean ZPP initiator is higher than the maximum temperatures predicted for fuel-lean ZHPP and THPP formulations. While higher temperatures are generally believed to be advantageous in promoting the desired dissociation of nitrous oxide, the lower maximum temperatures predicted for the fuel-lean ZHPP and THPP formulations may be at least partially compensated for by adjusting the respective ZHPP or THPP formulation to yield a more fuel-rich (e.g., near stoichiometric) mixture. As would be expected from theory and as is known in the art, for a given such pyrotechnic material (for example, ZHPP), as the equivalence ratio increases from 0.6 to 1.0, the maximum temperature also increases. Given progressively more-fuel rich conditions, the maximum temperature will begin to slowly decrease as the equivalence ratio exceeds about 1.1. It may, however, be desirable to operate at such equivalence ratios because the combustion products would be expected to contain hot, radiant and unburned metal fuel particles. Such particles would then be available for combustion reaction in the nitrous oxide environment within the inflator and thus serve to promote nitrous oxide dissociation.

It will be appreciated that reaction of such metal hydrides will typically result in the formation of both water and hydrogen. The calculations here presented are based on the fuel-to-oxidant ratio of the reactants, which is identical in both of the above-presented reactions, reactions (3) and (4). Further, one skilled in the art will appreciate that at the extreme temperatures of the combustion products, it is generally not possible to accurately predict the exact proportions of the various hydrogen-bearing compounds combustion products as, for example, formed water may in turn dissociate into molecular components, for example. In view thereof, while the exact ratio of the amount of water formation to hydrogen formation is not necessarily important, it is significantly noted that some hydrogen (molecular and/or atomic) will be available for combustion in the nitrous oxide environment provided by subject inflators. Further, the results presented in the above Table clearly indicate that with such metal hydrides, the amount of hydrogen produced will generally increase as the equivalence ratio approaches one. As described above, such hydrogen product will in turn be available for reaction with nitrous oxide within the inflator and the energy released through such reaction can aid in heating the exhaust products as well as any remaining stored gas mass contained within the inflator.

Thus, in accordance with one embodiment of the invention, such metal hydrides are a particularly preferred pyrotechnic for use in the practice of the invention. In particular, in accordance with certain preferred embodiments of the invention, near stoichiometric or slightly fuel-rich formulations of metal hydrides, in particular, the metal hydrides ZHPP and THPP, can advantageously be used in the practice of the invention.

It will be appreciated that the predicted values of the various combustion product parameters presented in these computer simulations may, due to these various assumptions and limitations, differ in certain respects from the results obtained in actual physical trials. The analytically derived parameter values presented here above do, however, demonstrate trends and can serve as a guide for future development.

Thus, the invention relates to improvements in an apparatus and method for inflating an inflatable device such as an inflatable vehicle occupant restraint for use in such an inflatable restraint system through either or both the proper formulation of the dissociation initiator pyrotechnic constituents and control of the formulation stoichiometry.

The invention further comprehends inflator apparatus and component designs and corresponding methods of operation wherein products produced by the combustion of a pyrotechnic initiator can be used to promote further dissociation. For example, hydrogen produced upon the actuation and discharge of metallic hydride-based initiator devices can be available for reaction with the nitrous oxide-bearing surrounding environment.

The invention yet still further comprehends inflator apparatus and component designs and corresponding methods of operation wherein one or more physical characteristic of the pyrotechnic material, such as the particle size distribution of the metal fuel, can be selected to promote more efficient or complete dissociation.

It is to be understood that the discussion of theory, such as the discussion of the details theorized to be involved with dissociation, for example, is included to assist in the understanding of the subject invention and is in no way limiting to the invention in its broad application.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An initiator device for an inflator which contains a quantity of a gas source material and which inflator generates gas for inflating an inflatable device via dissociation of at least a portion of the quantity of gas source material, said initiator device comprising:

a zirconium hydride potassium perchlorate pyrotechnic formulation which, upon actuation of the initiator device, discharges to initiate dissociation of at least a portion of the quantity of gas source material contained within the inflator forming dissociation products used to inflate the device and to form particles to interact with one or more of at least a portion of the remaining quantity of gas source material contained within the inflator and dissociation products to form additional inflation products for inflating the inflatable device.

2. The initiator device of claim 1 wherein said particles comprise hot radiant metal particles.

3. The initiator device of claim 1 wherein said particles comprise fuel.

4. The initiator device of claim 1 wherein said pyrotechnic formulation comprises fuel in at least near stoichiometric amount relative to the oxidant content thereof.

5. In a method for inflating an inflatable safety device in a vehicle using an inflator which generates inflation gas via dissociation of a quantity of nitrous oxide gas source material stored within a chamber of the inflator, the step of:

actuating an initiator containing a zirconium hydride potassium perchlorate pyrotechnic formulation to produce sufficient heat to initiate dissociation of at least a portion of the quantity of nitrous oxide gas source material to form nitrous oxide dissociation products including at least one gaseous dissociation product used to inflate the device and to form particles to interact with one or more of at least a portion of the quantity of nitrous oxide and the nitrous oxide dissociation products to form additional gaseous products used to inflate the device.

6. The method of claim 5 wherein the particles comprise hot radiant metal particles.

7. The method of claim 5 wherein the particles comprise fuel.

* * * * *